UNITED STATES PATENT OFFICE.

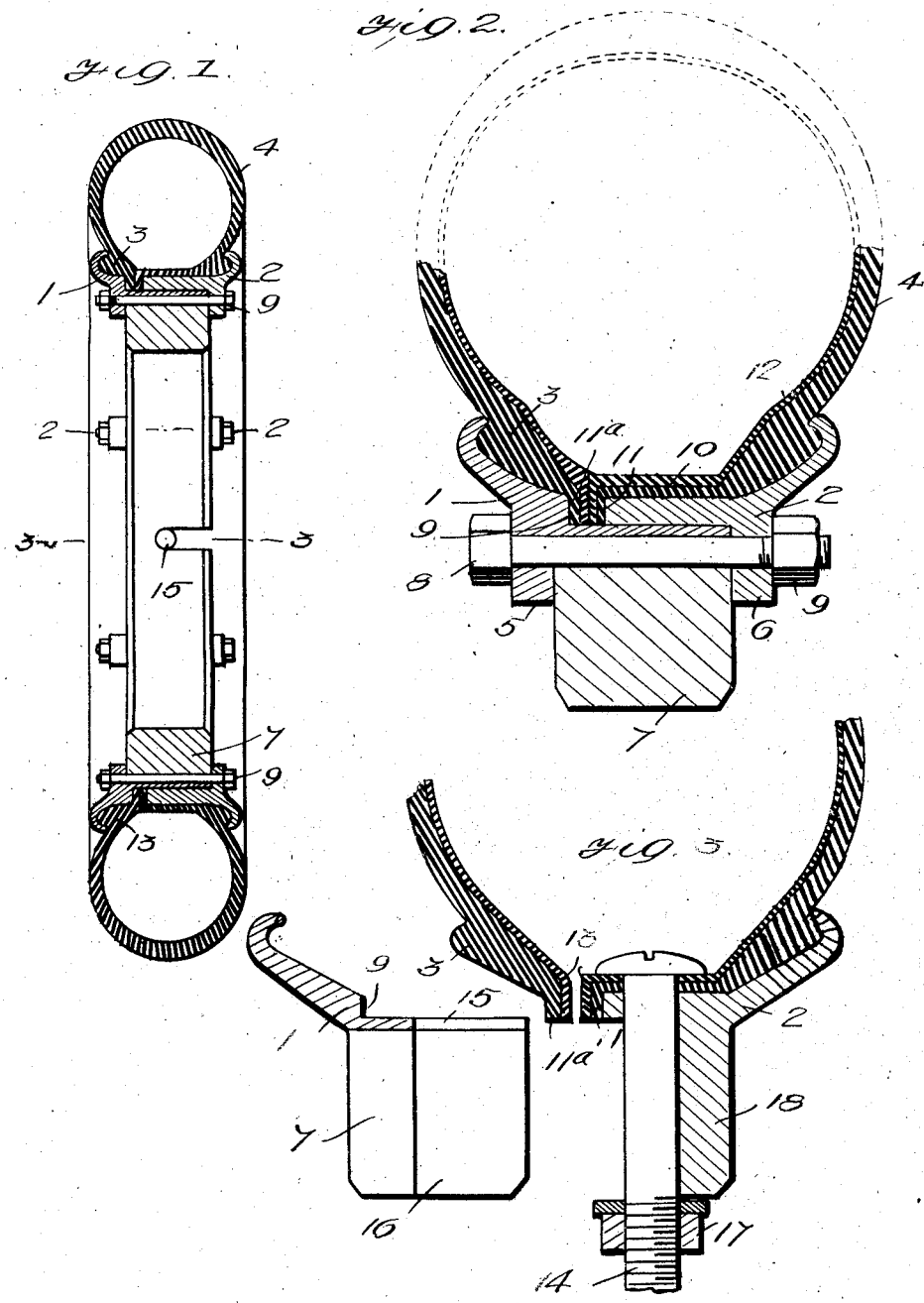
H. D. REY.
VEHICLE WHEEL.
APPLICATION FILED MAY 29, 1918.
1,333,679.
Patented Mar. 16, 1920.
5 SHEETS—SHEET 1.
WITNESSES
INVENTOR
Henri D. Rey
BY
ATTORNEYS

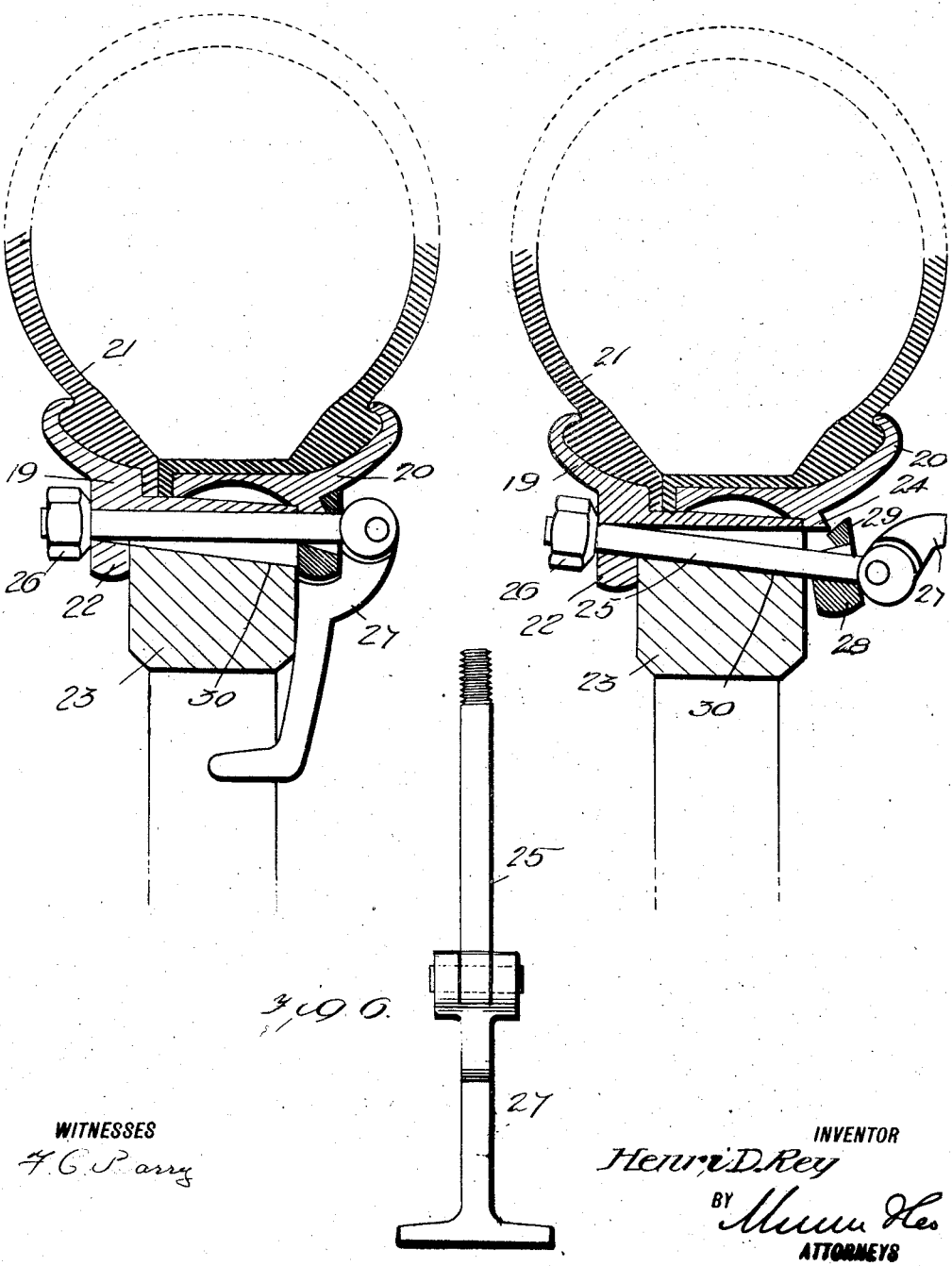

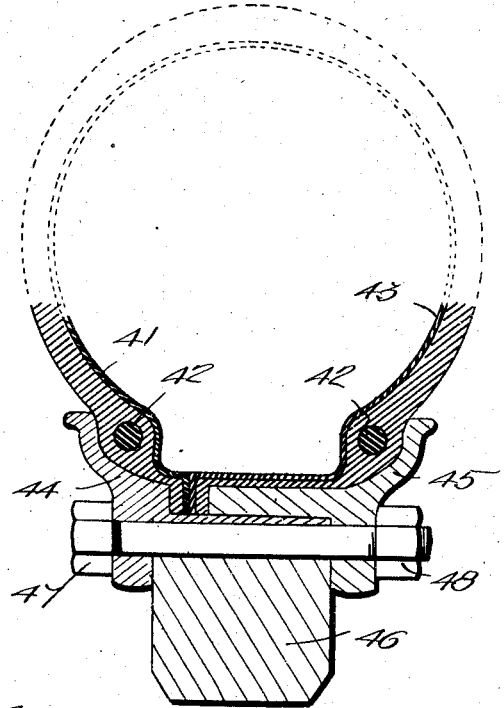
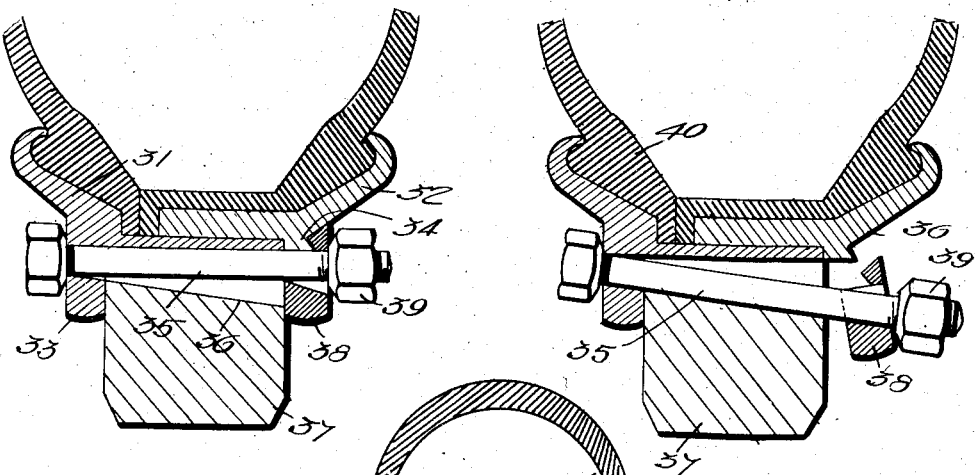
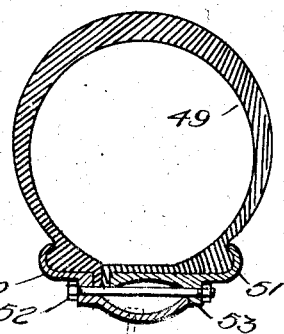

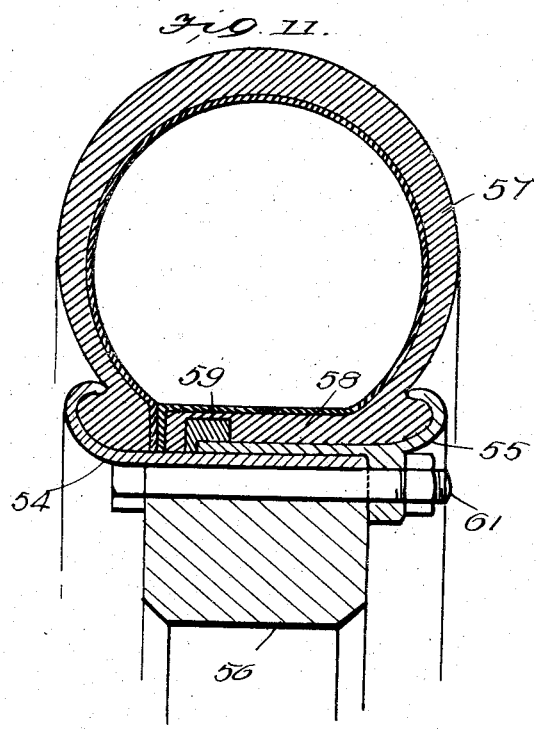
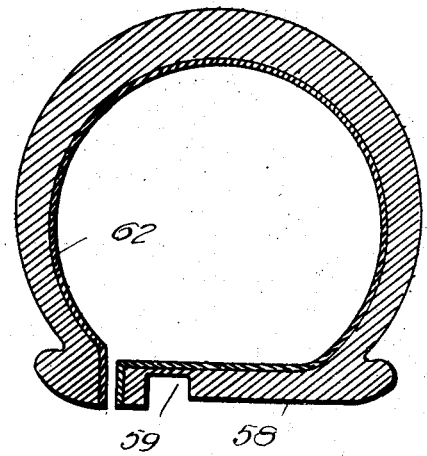
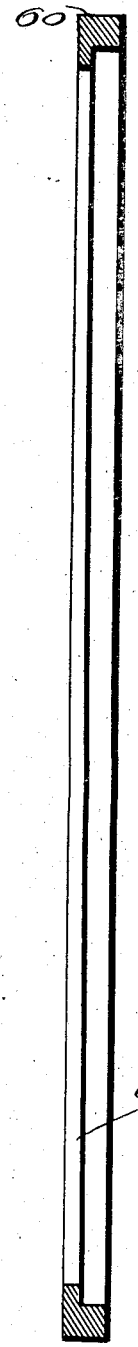

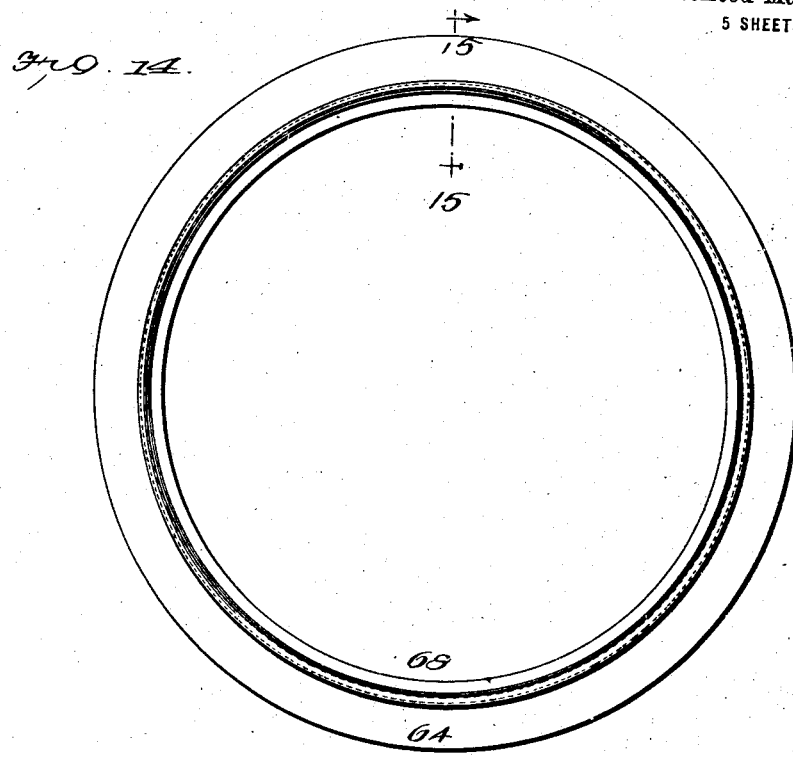
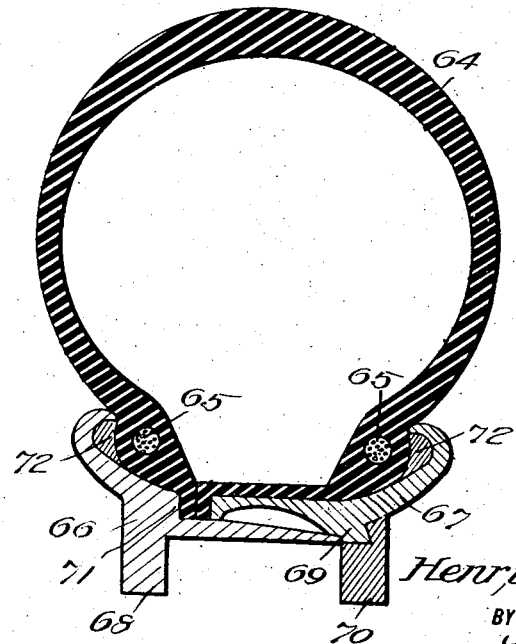

HENRI DANIEL REY, OF AVARUA, ISLAND OF RAROTONGA, COOK ISLANDS, NEW ZEALAND.

VEHICLE-WHEEL.

1,333,679.   Specification of Letters Patent.   Patented Mar. 16, 1920.

Application filed May 29, 1918. Serial No. 237,241.

*To all whom it may concern:*

Be it known that I, HENRI DANIEL REY, a citizen of the French Republic, and a resident of Avarua, in the island of Rarotonga, one of the Cook Islands, within the boundaries of New Zealand, have invented certain new and useful Improvements in Vehicle-Wheels, of which the following is a specification.

My invention is an improvement in vehicle wheels, and has for its object to provide mechanism for permitting pneumatic tires to be easily and quickly attached to or detached from the wheel, and for sealing the abutting edges of the shoe or casing to provide a closed tube that may be inflated directly without the use of an inner tube, wherein a particular form of tire is provided having the usual holding ribs of the clencher type and having an extension from one side edge to abut the other side edge to permit the edges to be sealed, a sectional rim being provided, the sections clamping the edges of the tire between them to seal the same, mechanism in connection with the said sections of the rim being provided to permit one of the sections to be easily and quickly detached from the other section and from the wheel.

In the drawings:

Figure 1 is a vertical section through a wheel constructed in accordance with the invention;

Figs. 2 and 3 are sections on the line 2—2 and 3—3 of Fig. 1;

Fig. 4 is a transverse section of another embodiment of the invention showing the parts in another position;

Fig. 5 is a similar view showing the parts in another position;

Fig. 6 is a plan view of the clamp;

Fig. 7 is a view similar to Fig. 4, showing another embodiment of the invention;

Fig. 8 is a similar view showing the parts in another position;

Figs. 9, 10 and 11 are similar views of other embodiments of the invention;

Fig. 12 is a sectional view showing the tire removed;

Fig. 13 is a sectional view of the locking ring;

Fig. 14 is a side view of another embodiment of the invention;

Fig. 15 is a section on the line 15—15 of Fig. 14.

In the embodiment of the invention shown in Figs. 1, 2 and 3, a sectional rim is provided, consisting of a section 1 and a section 2, each of which has the usual hooked flange for engaging the holding rib 3 of the shoe or casing 4, and these ribs are arranged in their usual relative position with respect to the shoe or casing.

Each section also has depending flanges 5 and 6 which fit the opposite faces of the felly 7, and bolts 8 are passed through registering openings in these flanges and in the felly to hold the rim sections together on the felly, each bolt being engaged by a nut 9. The section 1 of the rim extends entirely across the outer face of the rim and the section 2 of the rim is superposed on the section 1. This section is, however, of less width than the section 1, so that a space is left between the inner edge of the section 2 and an annular flange or shoulder 9 formed between the body of the rim section and the hooked flange.

That edge of the shoe or casing adjacent to the section 2 is extended as indicated at 10 to extend across the rim section 2 and the said extension has an inwardly extending flange or rib 11 which fits between the abutting faces of the section 2 and the shoulder 9. The opposite edge of the shoe or casing is also provided with a flange or rib 11ª similar to the flange 11, and these two ribs or flanges are clamped between the said abutting sections of the rim section 2 and the shoulder 9.

When an inner tube is used as indicated at 12, the inner tube has its edges received between abutting faces of the ribs 11—11ª, as indicated at 13, and they are clamped between the ribs or flanges 11—11ª. When the nuts 9 are turned home, the ribs 11—11ª and the edges 13 of the inner tube will be tightly clamped together, between the abutting faces of the section 2 and the shoulder 9, and a fluid-tight seal will be provided at this point, to prevent the escape of air from the shoe or from the inner tube. It will be obvious that an ordinary inner tube might be used in place of the tube 12 or the inner tube might be dispensed with, a gasket being provided at each of the ribs 11 and 11ª. Where the valve tube 14 passes from the inner tube 12 and from the shoe or casing through the rim, the section 1 of the rim has a notch or recess 15 through which the tube extends, and the felly 7 has a notch 16 registering with the notch 15 through which the tube 14 passes.

A nut 17 is threaded on to the tube on the inner side of the felly and the section 2 at this point has an extension 18 for filling that portion of the notch 16 outside of the tube 14. With the above described construction, when it is desired for any reason to remove the shoe or casing, the bolts 9 are released and the section 2 of the rim is removed. That edge of the shoe or casing adjacent to the section 2 is slipped out of place and the entire shoe or casing comes away from the section 1, the valve tube 14 coming away with the other parts.

In the embodiment of the invention shown in Figs. 4, 5, and 6, the rim consists of sections 19 and 20, each having the usual hooked flange for engaging the holding ribs of the shoe or casing 21. The section 19 also has an inwardly extending flange 22 lapping upon the adjacent face of the felly 23. The section 20 has a rib or flange 24, which extends to the inner face of the section 19, and this rib or flange 24 has its outer face undercut as shown. The edges of the shoe or casing are clamped between the sections 19 and 20 in the same manner as described for the embodiments shown in Figs. 1, 2 and 3, and the sections of the rim are clamped together by means of bolts 25. Each of these bolts has at one end a nut 26 and at the other a lever 27 pivoted to the bolt and provided with a cam shaped head. The bolts are passed through registering openings in the rib or flange 22 and in the felly, and through openings in latch plates 28. These latch plates have catches 29 for engaging the undercut faces of the ribs 24, and the openings 30 through the felly are tapering, as shown, gradually increasing in cross section from the face adjacent to the flange 22 to the opposite face, the enlargement being toward the inner face of the felly, so that when the latches 28 are released, as shown in Fig. 5, the ends of the bolts adjacent to the lever 27 as well as the latch plates 28 will move radially inward, to permit the section 20 of the rim to be drawn out without interference with the latch plate or the lever.

In order to apply the shoe or casing in the above embodiment, the rim sections are placed as shown in Fig. 5, the latch plates are engaged with the ribs 24 and the levers 27 are moved into the positon of Fig. 4. The rim sections may be drawn toward each other by means of the nuts 26, and when once they are so drawn the abutting edges of the shoe or casing are sealed to provide a fluid-tight joint. To release the shoe or casing it is only necessary to swing the inner ends of the levers 27 outwardly, as shown in Fig. 5. This relieves the pressure of the latch plates 28 sufficiently to permit them, together with the bolt 25, to take the position of Fig. 5, thus releasing the rim section 20 which may now be removed. With this construction the valve tube (not shown) may be arranged in the same manner as shown in Figs. 1 to 3.

In the embodiment of the invention shown in Figs. 7 and 8, the rim sections 31 and 32 are similar to the sections 19 and 20, the section 31 having the inwardly extending rib 33 and the section 32 having the undercut rib 34. The bolts 35 pass through similarly shaped openings 36 in the felly 37, and the latch plates 38 are similar to the latch plates 28. Instead of the lever 27, however, a nut 39 is used, and the parts are clamped together by the nut. The construction is otherwise the same, the edges of the shoe or casing 40 being clamped together by the rim sections.

In Fig. 9 the shoe or casing 41 has at the holding ribs reinforcing cables 42. An inner tube 43 is also provided, and the edges of the tube and of the shoe or casing are clamped between the rim sections 44 and 45. These sections are held on the felly 46 by bolts 47 and nuts 48, and the valve tube may be arranged as shown in Figs. 1 and 3.

In Fig. 10 is shown a construction especially adapted for wire wheels. In this arrangement the casing 49 is clamped by the rim sections 50 and 51, the sections being held together by bolts and nuts 52. The section 50 of the rim has its body portion arched inwardly and extending across into abutting relation with the inwardly extending rib 53 of the section 51. With this arrangement the spokes may be connected directly with the body portion of the section 50.

In the embodiment of the invention shown in Figs. 11, 12 and 13, the rim consists of sections 54 and 55, the section 54 lying directly on the felly 56, while the section 55 lies upon the section 54. The shoe or casing 57 has at that edge adjacent to the section 55 an extension 58 extending across the outer face of the rim to near the rib 54, and this extension 58 has in the face adjacent to the rim an annular groove 59. This groove is at a point such that the free edge of the rim section 55 will extend over a little more than one-half the width of the groove, and a locking ring 60 is held in this groove, the said ring being L-shaped, so that it will fit in the groove about the inner edge of the section 58. The sections 54 and 55 of the rim are clamped together by bolts and nuts 61 and when an inner tube 62 is used, the edges of the tube are clamped between the abutting edges of the shoe or casing. The inner edge of the section 55 bears against the inwardly extending rib 63 of the ring 60, while the body of the ring rests upon the outer face of the said section. When the nuts are screwed down tightly upon the bolts, the locking ring 59 is firmly held by the rim section 55, thus tightly clamping the shoe or casing in place.

In Figs. 14 and 15, the shoe or casing 64 has reinforcing cables 65 at its holding ribs, and the shoe or casing is locked upon the felly (not shown) by means of the rim sections 66 and 67. The section 66 has an inwardly extending flange or rib 68 fitting the adjacent face of the felly, and the section 67 of the rim has the inwardly extending rib 69 provided with the undercut face for engagement by the latch plates 70. These latch plates may be mounted in the same manner as those shown in Figs. 4 and 9, and the edges of the shoe or casing are clamped between the inner edge of the section 67 of the rim and the annular shoulder 71 on the section 66.

Referring to Fig. 15, it will be noticed that the hooked flanges 66 and 67 have their hooks of considerable depth, of greater depth than the height of the holding ribs of the shoe or casing, and retaining rings 72 are held in the hooked flanges between the bottoms of the said flanges and the holding rings.

It will be obvious that the invention provides means for sealing the edges of a shoe or casing to prevent the escape of air under pressure, thus permitting to dispense with the use of an inner tube if desired. In addition, the arrangement provides for a very easy and quick removal of the shoe or casing when it is desired to remove the same for any reason. The shoe is also very easily replaced, and the tire or shoe cannot creep with respect to the wheel whether the tire be inflated or deflated. In addition, shoes or casings having wired or reinforced beads may be adapted for clencher type tires, as, for instance, as shown in Figs. 9 and 15.

I claim:

1. In combination with a felly, a sectional rim, one of the sections engaging the felly and the other lying upon the first named section, said sections having flanges at their remote edges for engaging the holding ribs of a pneumatic tire and having surfaces adapted abut with each other to limit the movement of the sections toward each other, means for forcing the sections together, a tire having holding ribs for engagement by the flanges of the sections, and having an extension at that side edge adjacent to the outermost rim section and adapted to extend across the rim to contact with the other side edge of the tire, the sections of the rim having surfaces for engaging the said abutting edges to clamp the said edges and seal the tire.

2. In combination with a felly, a rim consisting of a section encircling the felly and lying thereon and having at one edge a hooked flange for engaging the holding rib of a pneumatic tire, said section extending across the felly, another section engaging outside of the first named section at the opposite edge from the hooked flange and having means for engaging the said edge of the first named section remote from the hooked flange to limit the movement of the last named section toward the first named section, said last named section having at its outer edge a hooked flange for engaging the holding rib of a pneumatic tire, the first named section having an annular shoulder facing the inner edge of the last named section in spaced relation when said sections are in normal position, means for forcing the sections together, a pneumatic tire having holding ribs for engagement by the hooks and having an extension at that side edge adjacent to the last named rim section extending across the said section, said extension and the opposite side edge of the tire each having a radial inwardly extending continuous rib engaging between the shoulder of the first named section and the edge of the other section to be sealed by said sections.

3. In combination with a felly, a rim consisting of a section encircling the felly and lying thereon and having at one edge a hooked flange for engaging the holding rib of a pneumatic tire, said section extending across the rim, the other section engaging outside of the first named section at the opposite edge from the hooked flange and having means for engaging the said edge of the first named section remote from the hooked flange to limit the movement of the last named section toward the first named section, said last named section having at its outer edge a hooked flange for engaging the holding rib of a pneumatic tire, the first named section having an annular shoulder facing the inner edge of the last named section in spaced relation when said sections are in normal position, and means for forcing the sections together.

4. In combination with a felly, a sectional rim, the sections being divided in a plane substantially parallel with the plane of the wheel to permit them to move laterally away from the wheel, a tire casing having edges adapted to fit between the sections and the sections having abutting edges for engaging the said edges to seal the casing, means for clamping the sections together, said means comprising bolts connecting the sections and mounted to swing inwardly at one end to release one section when the bolts are loosened, and cam levers in connection with the bolts for tightening the same.

5. In combination with a felly, a sectional rim, the sections being divided in a plane substantially parallel with the plane of the wheel to permit them to move laterally away from the wheel, a tire casing having edges adapted to fit between the sections and the sections having abutting edges for engaging the said edges to seal the casing, and means for clamping the sections together, said means comprising bolts connecting the sections and mounted to swing inwardly at one end to release one section when the bolts are loosened.

HENRI DANIEL REY.

Witnesses:
W. McBIRNEY,
E. H. MITCHELL.